United States Patent
Bai (10) Patent No.: US 11,354,078 B2
(45) Date of Patent: Jun. 7, 2022

(54) AUTOMATED TEMPLATE GENERATION FOR TILING

(71) Applicant: KYOCERA Document Solutions Inc., Osaka (JP)

(72) Inventor: Xuqiang Bai, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/394,292

(22) Filed: Aug. 4, 2021

(65) Prior Publication Data

US 2021/0397394 A1 Dec. 23, 2021

Related U.S. Application Data

(62) Division of application No. 16/706,687, filed on Dec. 7, 2019, now Pat. No. 11,106,410.

(51) Int. Cl.
*G06F 3/12* (2006.01)
*G06T 11/40* (2006.01)

(52) U.S. Cl.
CPC ............ *G06F 3/1257* (2013.01); *G06F 3/122* (2013.01); *G06F 3/1206* (2013.01); *G06F 3/1254* (2013.01); *G06T 11/40* (2013.01); *G06F 3/1279* (2013.01); *G06T 2210/12* (2013.01)

(58) Field of Classification Search
CPC ...... G06F 3/1257; G06F 3/1206; G06F 3/122; G06F 3/1254; G06F 3/1279; G06T 11/40; G06T 2210/12
See application file for complete search history.

(56) References Cited

U.S. PATENT DOCUMENTS

| | | | |
|---|---|---|---|
| 2003/0011623 A1* | 1/2003 | Dermer | G06T 11/40 345/635 |
| 2019/0279331 A1* | 9/2019 | Filler | G06F 3/122 |
| 2020/0001621 A1* | 1/2020 | Zhu | G06F 3/1257 |
| 2020/0226762 A1* | 7/2020 | Milovanovic | G06T 19/006 |

* cited by examiner

*Primary Examiner* — Iriana Cruz
(74) *Attorney, Agent, or Firm* — W. Eric Webostad (57) ABSTRACT

Methods relating generally to printing to a medium with a printer are disclosed. In one such method, a plurality of objects ("the objects") for a tile is received. An object count for each object type of the objects is counted. A tile-reuse count is initialized. A tile object associated with the objects is generated. Tile area data for the tile, tiling area data for a tiling area, and bounding region data for a bounding region are received. A check is performed for the tile area data having at least one dimension exceeding a corresponding bounding region dimension of the bounding region data. It is determined that the tiling area data does have at least one dimension exceeding the bounding region dimension. Responsive to the determining the tiling area data does have at least one dimension exceeding the bounding region dimension, a template for the tile is generated for non-overlapping tiling.

11 Claims, 7 Drawing Sheets

AUTOMATED TEMPLATE GENERATION FOR TILING

CROSS-REFERENCE TO RELATED APPLICATIONS

The present application is a divisional application of U.S. patent application Ser. No. 16/706,687, filed 7 Dec. 2019 (now U.S. Pat. No. 11,106,410), the disclosure of which is incorporated herein by reference in its entirety for all purposes consistent herewith.

TECHNICAL FIELD

The following description relates to tiling. More particular, the following description relates to automated template generation for tiling by a printer printing to a medium.

BACKGROUND

Conventionally, tiles are used to "print tile" a tiling area. In some instances, a template was prepared by a user for such printer tiling. Such a tile may be a user selected portion of a bitmapped image.

SUMMARY

In accordance with one or more below described examples, a method relating generally to printing to a medium with a printer is disclosed. In such a method, a plurality of objects for a tile is received. A check for a template for the tile is performed. A tile-reuse count is incremented responsive to absence of the template. A check for an object of the plurality of objects having an object type in a predefined group is performed. Responsive to the object type not in the predefined group, a check for the tile-reuse count exceeding a total reuse threshold is performed. Responsive to the tile-reuse count exceeding the total reuse threshold, the template for the tile is generated.

In accordance with one or more below described examples, another method relating generally to printing to a medium with a printer is disclosed. In such a method, a plurality of objects for a tile is received. An object count for each object type of the plurality of objects of the tile is counted. A tile-reuse count is initialized. A tile object associated with the plurality of objects is generated. Tile area data for the tile, tiling area data for a tiling area, and bounding region data for a bounding region are received. A check is performed for the tile area data having at least one dimension exceeding a corresponding bounding region dimension of the bounding region data. It is determined that the tiling area data does not have at least one dimension exceeding the bounding region dimension. Responsive to the determining the tiling area data does not have at least one dimension exceeding the bounding region dimension, a check for a total number of the plurality of objects exceeding an objects threshold is performed. Responsive to the determining to the total number of the plurality of objects exceeds the plurality of objects threshold, a template for the tile is generated.

In accordance with one or more below described examples, yet another method relating generally to printing to a medium with a printer is disclosed. In such a method, a plurality of objects for a tile is received. An object count for each object type of the plurality of objects of the tile is counted. A tile-reuse count is initialized. A tile object associated with the plurality of objects is generated. Tile area data for the tile, tiling area data for a tiling area, and bounding region data for a bounding region are received. A check is performed for the tile area data having at least one dimension exceeding a corresponding bounding region dimension of the bounding region data. It is determined that the tiling area data does have at least one dimension exceeding the bounding region dimension. Responsive to the determining the tiling area data does have at least one dimension exceeding the bounding region dimension, a template for the tile is generated for non-overlapping tiling.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIGS. 2-1 through 2-3 are pictorial diagrams depicting respective examples of objects of the tile of FIG. 1.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

Templates for printer tiling consume memory. However, use of templates for tiling can improve printer tiling performance. As described below, thresholds are used to determine whether a template for a tile is to be generated. If a tile passes each threshold, there may be more than one depending on whether such tile has been used in printer tiling before for example, then a template is automatically generated for such tile.

With the above general understanding borne in mind, various configurations for automated template generation for printer tiling are generally described below.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

Figure 1:
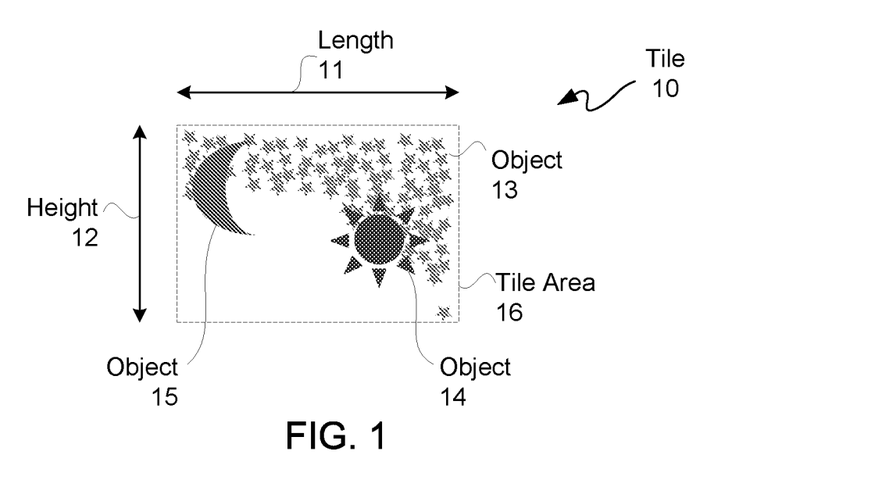
FIG. 1 is a pictorial diagram depicting an example of a tile.

FIG. 1 is a pictorial diagram depicting an example of a tile 10. In this example, tile 10 has a tile area 16 with a height 12 and a length 11. In this example, tile 10 is a rectangle; however, in other examples other geometric shapes may be used for tile 10.

Tile area 16 equates to or is directly related to memory usage. In other words, generally a large tile area 16 consumes more memory than a small tile area 16. Moreover, each object in tile area 16 consumes memory. Accordingly, if multiple tiles 10 are used to tile a tiling area, then each tile 10 used in tiling consumes memory.

To reduce memory consumption, a tile template for tile 10 may be generated as described below in additional detail.

In this example, tile 10 includes no word, and so no font object is present in this example of a tile. However, in another example, tile 10 may have a word or other writing.

In this example, tile 10 includes three objects 13, 14, and 15. However, in another example fewer or more objects than three may be present in tile 10. For clarity by way of example and not limitation, if an image includes multiple characters, for example 7 characters, of a word to provide a template, then in this example a space in memory may hold a rendered image including all 7 characters in this example. A template image may be used for tiling, such as without overlap. This is to contrast having separate images, which in this example would be 7 separate images, then overlapping such images when tiling to form such word multiple times. However, multiple objects, which in this example may be 7 separate objects, may be combined first to form a tile image or tile, and then tiling may proceed with such combined tile image.

FIGS. 2-1 through 2-3 are pictorial diagrams depicting respective examples of objects of tile 10 of FIG. 1. Objects 13 through 15 of tile 10 are further described with simultaneous reference to FIGS. 1 through 2-3.

Figure 21:
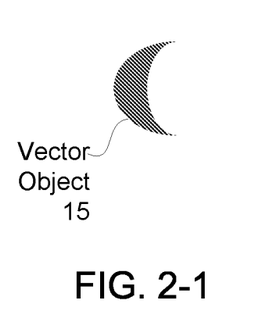

Object 13 is a raster object. A raster object 13 generally may take more processing time to print than a vector object. In this example, raster object 13 is a plurality of little stars clustered generally from left-to-right on an upper-half of tile area 16 and from top-to-bottom progressively dwindling along a right side of tile area 16.

Figure 22:
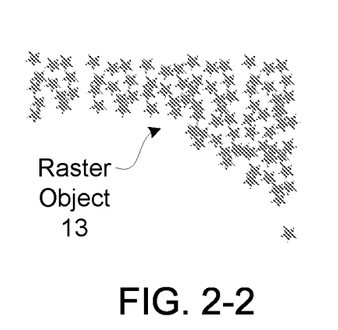
Figure 23:
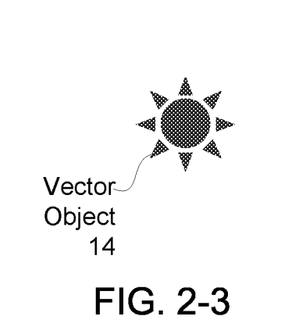

Overlying respective portions of raster object 13 are vector objects 14 and 15. Vector object 15 is a waning crescent moon shape, and vector object 14 is a "sun black shape" of a circle with separated triangles disposed around and not touching such circle.

While examples of a raster object 13 and vector objects 14 and 15 are provided, it should be understood that these or other objects may be used in other tiles. Furthermore, though there are two vector objects and one raster object in this example, in another example one or more font objects, vector objects, and/or raster objects may be used.

Figure 3:
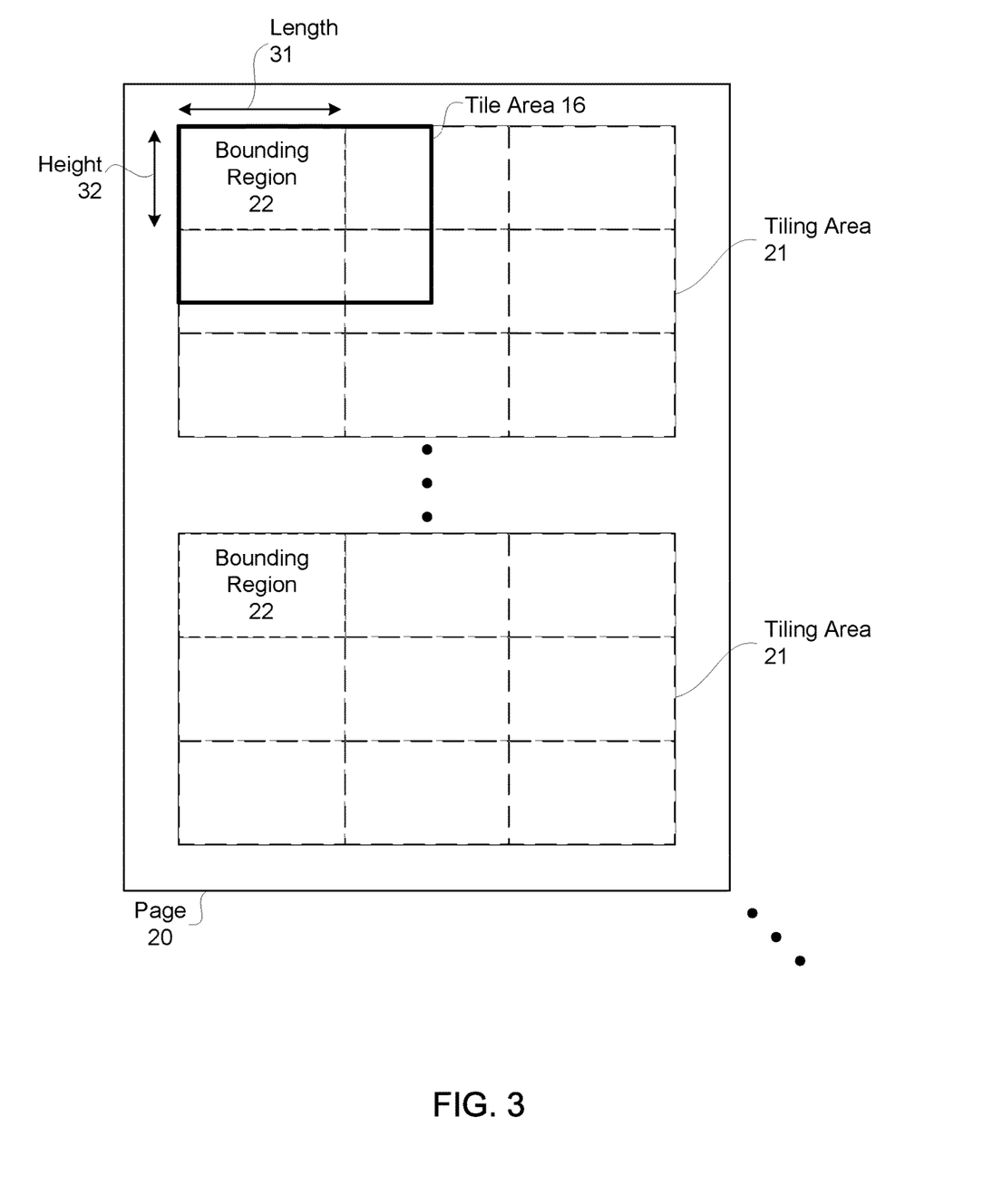
FIG. 3 is a plan diagram depicting an example of a page with tiling areas.

FIG. 3 is a plan diagram depicting an example of a page 20 with tiling areas 21. FIG. 3 is further described with simultaneous reference to FIGS. 1 through 3.

In this example, there are two tiling areas 21 on page 20; however, generally one or more tiling areas 21 may appear on a page 20. Furthermore, as generally indicated, there may be more than one page 20.

For this example, there may be multiple pages 20, where each page 20 includes two tiling areas 21. However, in another example, there may be one or more pages 20 each with one or more tiling areas 21. Furthermore, in this example, each tiling area 21 is a rectangle; however, in other examples other geometric shapes may be used for tiling area 21.

Each tiling area 21 may be divided up into multiple bounding regions 22 for purposes of tiling. Each bounding region 22 may have a height 32 and a length 31. In this example, tile area 16, which is larger in both height 32 and length 31 than bounding region 22, would produce overlapped tiles for tiling a tiling area 31 in both horizontal or x and vertical or y directions. However, in another example, only either overlapping in either an x or a y direction may be present.

Along those lines, in an example only one of height 32 and length 31 may be smaller than corresponding counterpart height 12 and length 11 of tile 10, with the other dimension equal to or less than a corresponding tile counterpart dimension. However, in this example both height 32 and length 31 are smaller than corresponding counterpart height 12 and length 11 of tile 10. In another example, height 12 may be greater than height 32, and length 11 may be equal to length 31. In yet another example, height 12 is may be equal to height 32, and length 11 may be greater than length 31.

In this example, bounding region 22 is a rectangle. However, in other examples, other geometric shapes may be used for bounding region 22. Furthermore, while in this example tile 10, tiling area 21, and bounding region 22 are all rectangles, in another example one or more of tile 10, tiling area 21, and bounding region 22 may be different geometric shapes from one another. Furthermore, though nine bounding regions 22 are indicated for each of tiling areas 21, in another example a tiling area 21 may have fewer or more than nine bounding regions 22.

Figure 4:
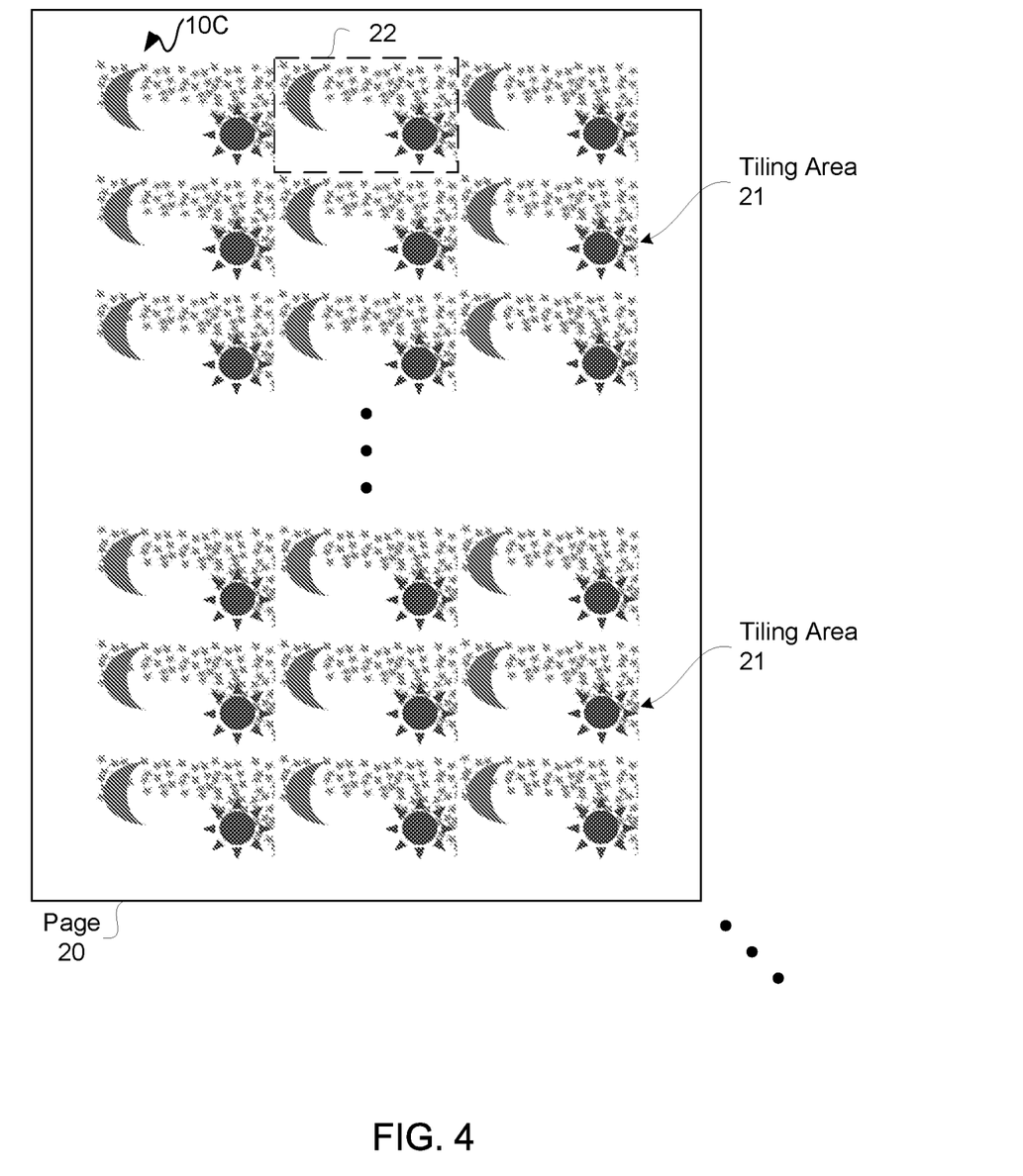
FIG. 4 is the plan diagram of FIG. 3 with tiling areas tiled with the tile of FIG. 1 bounded to a bounding region of FIG. 3.

FIG. 4 is the plan diagram of FIG. 3 with tiling areas 21 tiled with tile 10C, which is a cut down version of tile 10 of FIG. 1, for bounding to bounding region 22 of FIG. 3. In this example, both height 12 and length 11 of tile 10 are cut down to height 32 and length 31 of bounding region 22. This means for the example that a horizontal portion and a vertical portion of each tile 10 is removed in order to fit to a bounding region 22. Tiling areas 21 tiled with cut down versions of tile 10 may be tiled with a tiling flow. Such a tiling flow may be part of a printer driver of printer software, which may for example be stored in a printer as firmware or loaded into processor local or cache memory for execution.

Furthermore, a tile 10C may be loaded into processor cache memory for purposes of tiling. Along those lines, reducing memory consumption or usage by creating a template for a tile 10C may be advantageous for applications with limited cache or other memory used to store a tile 10C.

Figure 5:
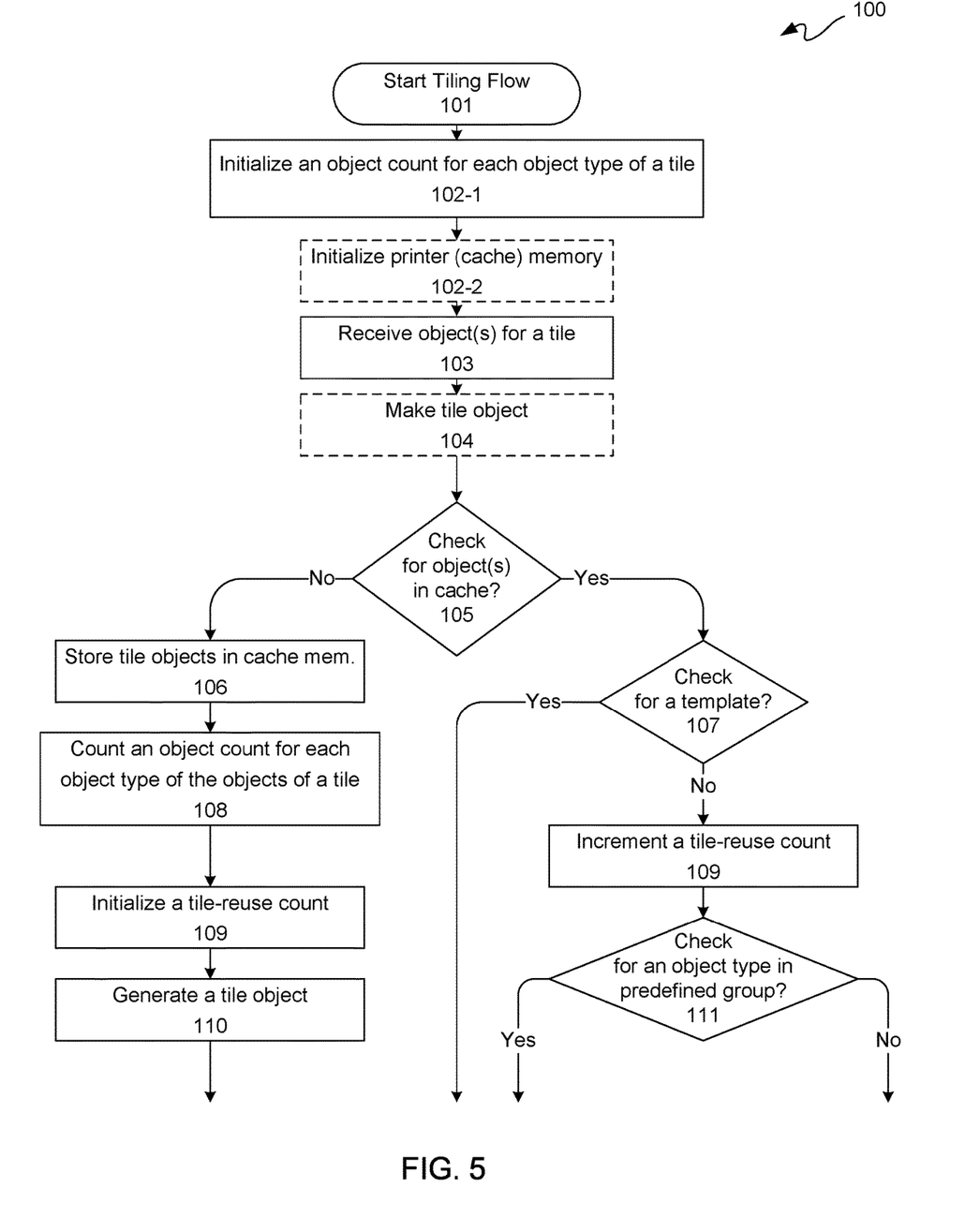
FIG. 5 is a flow diagram depicting an example of a tiling flow.

FIG. 5 is a flow diagram depicting an example of a tiling flow 100. Tiling flow 100 may be used for printing by a printer to a medium a tiling of tiles ("printer tiling"). More particular, tiling flow 100 may be used for automated template generation for printer tiling.

Because one or more of the examples described herein may be implemented in using a printer and/or a computing system, a detailed description of examples of each is provided. However, it should be understood that other configurations of one or more of these examples may benefit from the technology described herein.

Figure 6:
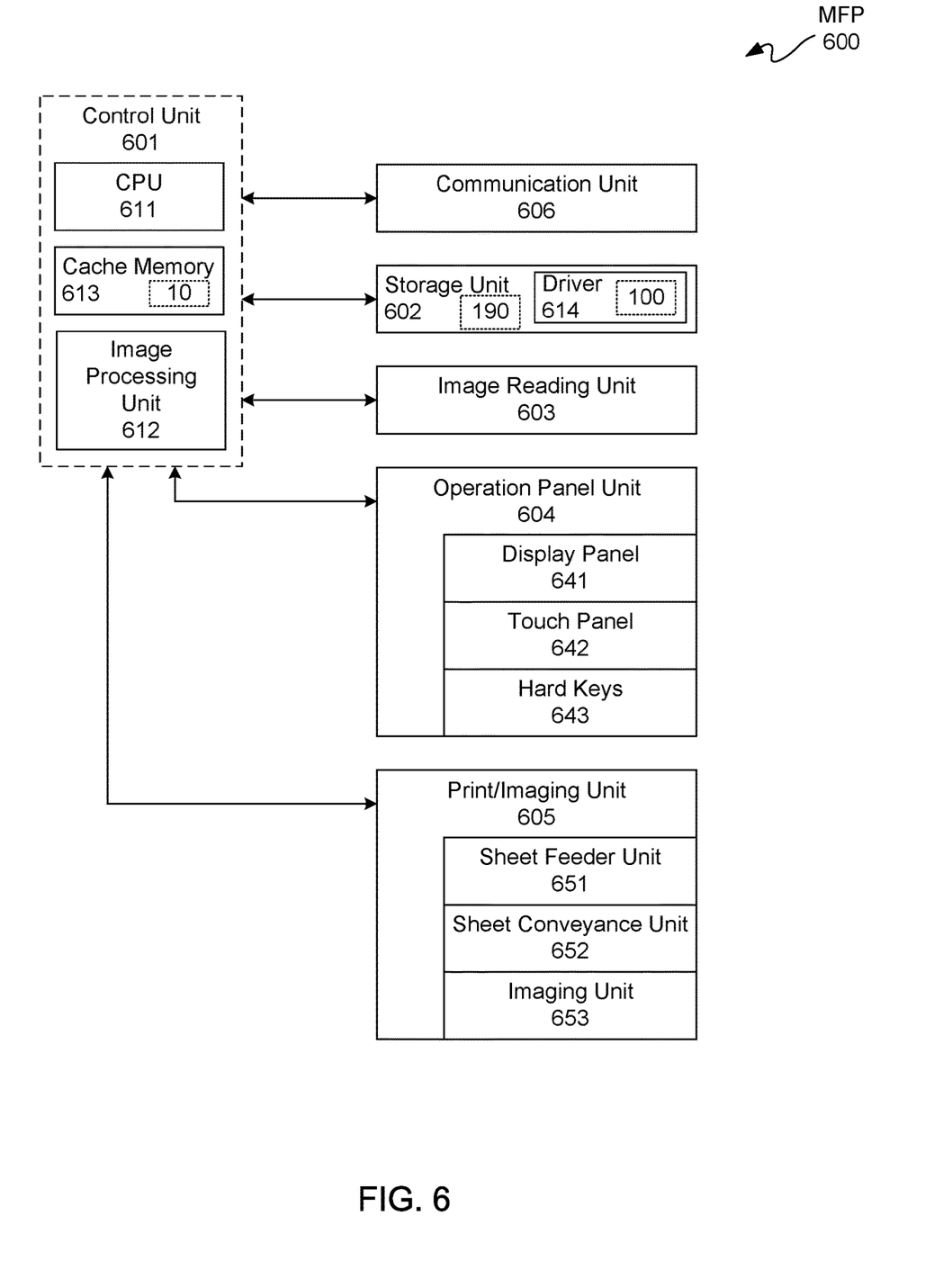
FIG. 6 is a block diagram depicting an example of a multi-function printer (MFP).

FIG. 6 is a block diagram depicting an example of a multi-function printer (MFP) 600. MFP 600 is provided for purposes of clarity by way of non-limiting example, as a printer only printer may be used in another example. MFP 600 is an example of a data processing system which may be used with tiling flow 100.

MFP 600 includes a control unit 601, a storage unit 602, an image reading unit 603, an operation panel unit 604, a print/imaging unit 605, and a communication unit 606. However, in another example, control unit 601 may be located separate from MFP 600. Communication unit 606 may be coupled to a network for communication with other peripherals, mobile devices, computers, servers, and/or other electronic devices.

Control unit 601 may include a CPU 611, an image processing unit 612, and cache memory 613. Storage unit 602 may include ROM, RAM, and large capacity storage memory, such as for example an HDD or an SSD. Storage unit 602 may store various types of data and control programs, including without limitation a printer driver 614. Printer driver 614 may include all, or portions of, code for tiling flow 100. However, tiling flow 100 may be embedded in a separate program or app or may be a standalone printer utility program.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Tiling flow 100 of FIG. 5 is further described with simultaneous reference to FIGS. 1 through 6. In an implementation, tiling flow 100 may be software in a printer driver 614 for a printer, such as for example an MFP 600. A printer driver 614, including, without limitation, coded tiling flow 100, may be stored in storage unit 602 of MFP 600. A tile 10 may optionally be loaded into cache memory 613 of MFP 600 as part of execution of tiling flow 100.

At 101, a tiling flow 100 may be started or initiated. Such initiation may be in response to receiving a tiling command, such as from a program or app.

At operation 102-1, object counts for each object type of a tile 10 may be initialized. For example, a first object count for a first object type, a second object count for a second object type, a third object count for a third object, and so on may be initialized. In the example of tile 10, there are only two object types, namely a raster object type and a vector object type. Thus, for the example of tile 10, a first object count and a second object count may be initialized at operation 102.

Optionally, at operation 102-2, printer cache memory 613 may be initialized. For purposes of clarity by way of non-limiting example, it is assumed that printer cache memory 613 is used; however, in another example another internal memory of a printer, such as storage unit 602 for example, or an external memory coupled to or in communication with MFP 600 may be used. Furthermore, though an MFP 600 is described for purposes of clarity by way of example, other types of printers, or more broadly other types of data processing systems, may be used in other examples.

At operation 103, each object for a tile may be received. In the example of tile 10, there are three objects 13 through 15, and so all three objects of tile 10 may be received at operation 104. Again, in another example, a tile 10 may have fewer or more than three objects. These objects may be combined to form a tile image or tile before tiling with same.

Optionally, at operation 104, a tile object may be generated for tile 10 using received objects obtained at operation 103. In this example, it may be assumed that all tile objects are in memory for a tile in order to generate a tile object linked to or having all such objects for generation at operation 104. However, for purposes of clarity by way of example and not limitation, it shall be assumed that not all objects for a tile may be present in memory for purposes of generation of a tile object at operation 104, and so optional operation 104 is assumed not to be present in the following example for purposes of clarity and not limitation.

At operation 105, a check may be made to determine if all objects, such as objects 13 through 15 in this example, for a tile are stored in memory. In this example, memory is cache memory ("cache") 613 of MFP 600. However, in another implementation, other memory, such as storage unit 602 for example, may be used to store objects for a tile.

If, at operation 105, it is determined whether all objects for a tile are stored in memory, such as for example in cache 613, as generally indicated by a dotted tile 10 therein in this example, If, at operation 105, it is determined that all objects for a tile are stored in memory, then at operation 107 a check may be made for existence of a template for such a tile. In this example, a template may be stored in storage unit 602, if present, as generally indicated with a dotted template 190; however, in another implementation, a template for a tile may be stored externally with respect to MFP 600.

If, at operation 107, it is determined that a template 190 exists for tile 10 for example, then each one or more designated tiling areas 21 to be tiled by a tile 10 may be tiled with template 190 therefor at operation 116B. Such tiling may include having objects linked to a template for tiling a tiling area by printing to a medium with a printer with repeated use of such template. Following such template tiling operation 116B, at operation 121 tiling flow 100 may end, exit, or return from whence called.

Tiling operation 116B from an affirmative response at operation 107 assumes no adjustment of a template 190 to a bounding region 22 for such tiling. However, if a template 190 is not dimensionally suitable for a current tiling operation to be performed, then at operation 107 it may be determined that a suitable template for a tile 10 is not present for a tiling operation, even though a template 190 does exist for a tile 10. Along those lines, operation 107 may be answered in the negative.

If at operation 107 it is determined that a template 190 does not exist for tile 10 or is not suitable for a current tiling operation, namely not available or absent for a current tiling operation, then at operation 109 a tile-reuse count may be incremented at operation 109.

At operation 111, a check may be made for at least one object of objects, such as objects 13 through 15 in this example, having an object type in a predefined group. Such a predefined group may be any certain type of object, like a raster object that needs color conversion for example, that takes a significant amount of time to preprocess before it can be used for tiling. Generally, a predefined group may be those types of objects that take significantly more time to preprocess than other types of objects for purposes of print tiling.

Responsive to no object type of objects of a tile 10 in such a predefined group as determined at operation 111, at operation 119 a check for a tile-reuse count exceeding a total reuse threshold may be made. This check at operation 119 may be used to determine whether a tile is used, or reused, often enough to justify generating and storing a template 190 for such tile.

If at operation 119 it is determined that a tile-reuse count does not exceed a total reuse threshold, then for example printer tiling with a tile 10, including each of objects 13 through 15, may be performed at operation 120, namely non-template or object-only based tiling. After printer tiling with a tile 10 at operation 120, at operation 121 tiling flow 100 may end, exit, or return from whence called.

If at operation 119 it is determined that a tile-reuse count does exceed a total reuse threshold, then at operation 113 a check may be made to determine if at least one tile area dimension is greater than a counterpart bounding region dimension to determine if any overlap condition is present. If at operation 113 it is determined that at least one tile area dimension is greater than a counterpart bounding region dimension, a tile template 190 may be generated at operation 114A, as described below in additional detail.

If at operation 111 it is determined that at least one object of objects in a tile 10 is in a predefined group, then optionally at operation 118 it may be determined whether a tile-reuse count is greater than or exceeds a group reuse threshold. A group reuse threshold may be used to determine whether one or more object types of a tile in a predefined group have been reused more than a predefined group reuse threshold associated therewith. A group reuse threshold used at operation 118 and a total reuse threshold 119 may be obtained or generated from data of an organization based on actual or experimental operations.

There may be different predefined groups with same or different predefined group reuse thresholds. For example, one or more object types requiring more preprocessing time prior to printer tiling may have a lower predefined group reuse threshold than another one or more object types requiring less preprocessing time prior to printer tiling.

However, for purposes of clarity by way of non-limiting example, it is assumed that there is only one predefined group with a corresponding group reuse threshold in this implementation.

Responsive to determining a tile-reuse count is not greater than a group reuse threshold at operation 118, at operation 119 a check for a tile-reuse count exceeding a total reuse threshold may be made. Responsive to determining a tile-reuse count is greater than or exceeds a group reuse threshold at operation 118, a check may be performed at operation 113, as described herein in additional detail.

For a tile template generated for a current tile to be used for a current tiling of a current bounding region, such generated template may be generated for tiling without overlap. However, if such tile template 190 previously generated is to be used in another tiling with one or more different dimensions for a different bounding region than used for generation of such tile template 190, then a check may be made for an overlap condition.

If, at operation 105, it is determined that all objects for a current tile are not stored in memory, such as for example cache 613, then at operation 106 all objects of a current tile 10 not stored in cache may be accessed and then stored in cache.

At operation 108, an object count may be made for each object type of objects of a tile. For the example of tile 10, there are three objects, but only two object types. Thus, for this example there may be a count of one for raster objects and a count of two for vector objects made at operation 108 for tile 10.

At operation 109, a tile-reuse count may be initialized. For objects of a tile not in memory 613 as determined at operation 105, such a tile may be a first use thereof, and so for example a tile-reuse count may be initiated for such a tile. Along those lines, a tile object for linking or having all objects of a tile may be generated or made for such a tile at operation 110. A tile object may be generated at operation 110 as previously described at optional operation 104.

From operation 110, at operation 112 tile area data for a currently processed tile may be received. Such tile area data may for example include height and length of a tile.

In addition to tile area data, bounding region data for a bounding region may be received at operation 112. Such bounding region data may for example include height and length of a bounding region.

In addition to tile area data and bounding region data, tiling area data for a tiling area may be received at operation 112. Such tiling area data may for example include height and length of one or more tiling areas.

At operation 113, a check may be made for such tile area data having at least one dimension exceeding a corresponding bounding region dimension of bounding region data. For example, a bounding region width in bounding region data may be checked to see if it is less than a width of a tile in tile area data. A bounding region width may be an x-tile step for a tiling operation. Likewise, for example, a bounding region height in bounding region data may be checked to see if it is less than a height of a tile in tile area data. A bounding region height may be a y-tile step for a tiling operation.

If, at operation 113, it is determined that tile area data does not have at least one dimension exceeding a corresponding bounding region dimension, then a check at operation 117, as to whether a total number of objects in a current tile exceeds an objects threshold, may be performed. Again, an objects threshold may be determined by actual and/or experimental data of an organization.

If such total number of objects does not exceed an objects threshold as determined at operation 117, then tiling with a tile object linked to objects of tile 10 in cache 613 for example may be performed at operation 120.

If, however, it is determined at operation 117 that such total number of objects does exceed an objects threshold, then a template 190 for such a tile may be generated at operation 114B. At operation 114B, a tile template may be generated with original dimensions of a tile, such as for example height and width of tile 10.

From operation 114B, at operation 115B a generated template 190 may be linked with objects, such as objects 13 through 15 for example, of a tile, such as for example tile 10, for a subsequent printer template tiling operation. At operation 1166, one or more tiling areas may be tiled by printing with a printer to a medium using a template 190 generated at operation 114B with objects of an associated tile linked to such template.

If, at operation 113, it is determined that a tile area data does have at least one dimension exceeding a corresponding bounding region dimension, namely indicating an overlapping condition, then at operation 114A a non-overlapped tile template 190 may be generated. At operation 114A, each dimension exceeding a corresponding bounding region dimension may be adjusted for non-overlapping tiling.

For example, responsive to a bounding region width being less than a tile width, namely an x-tile tiling step is less than a corresponding tile width, such tile width may be adjusted, such as cut down, to be equal to such bounding region width. Likewise, for example, responsive to a bounding region height being less than a tile height, namely a y-tile tiling step is less than a corresponding tile height, such tile height may be adjusted, such as cut down, to be equal to such bounding region height.

At operation 115A, each of such one or more objects of a tile, which may be stored in cache 613, may be linked with a non-overlap template 190 generated at operation 114A. At operation 115A, a non-overlap template 190 may be linked with objects, such as objects 13 through 15 for example, of a tile, such as for example tile 10, for a subsequent printer template tiling operation.

At operation 116A, one or more tiling areas for a medium may be tiled by printing with a printer to such medium using a non-overlap template 190 generated at operation 114A with objects of an associated tile linked to such template. Such tiling may include having objects linked to a template for tiling a tiling area by printing to a medium with a printer with repeated use of such template. Such objects may be obtained from cache 613 for such tiling. Performing non-overlapping tiling in a tiling area defined by tiling area data with a non-overlap template 190 may be performed by printing with a printer, such as MFP 600. Following such template tiling operation 116A, at operation 121 tiling flow 100 may end, exit, or return from whence called.

Figure 7:
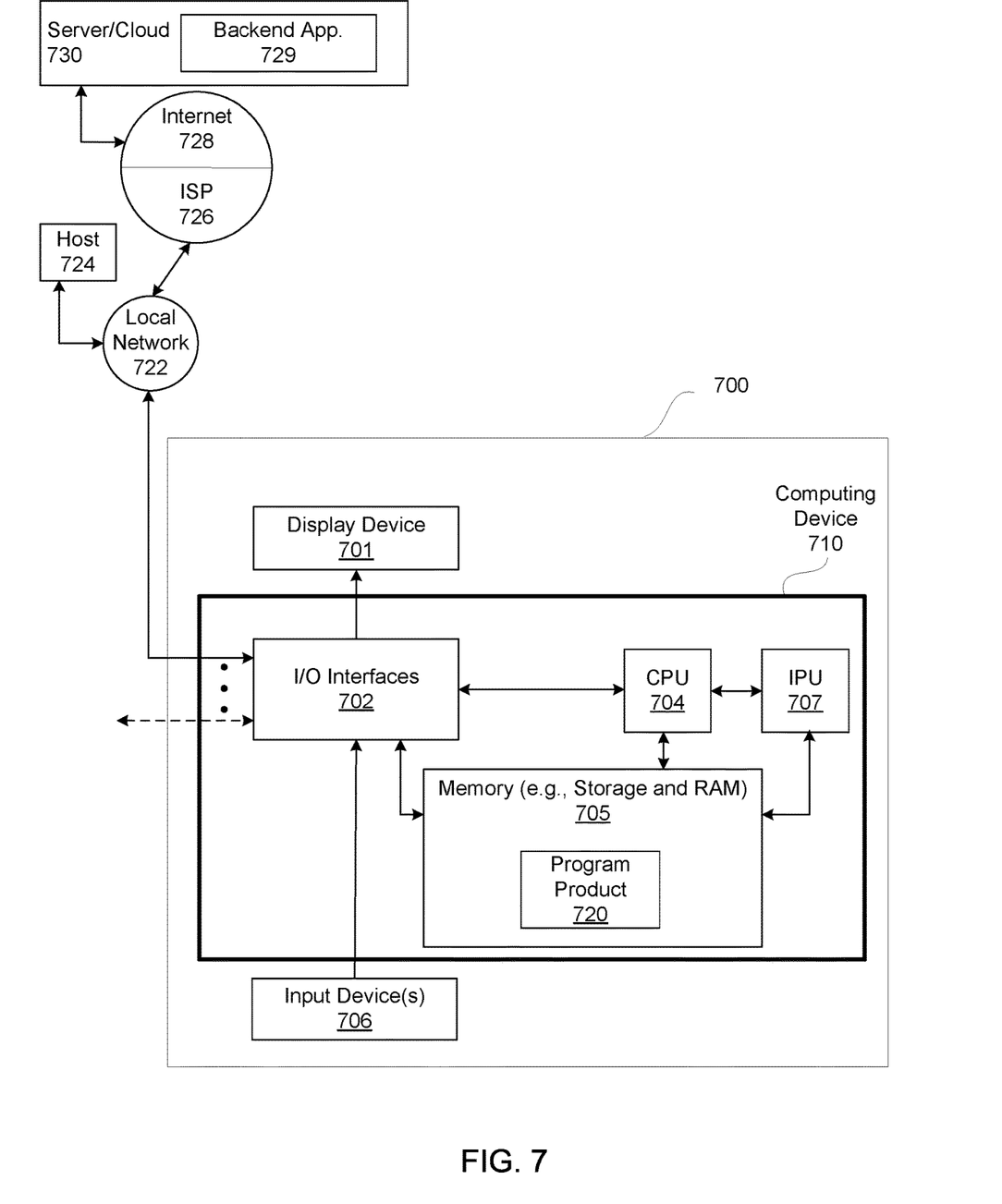
FIG. 7 is a block diagram depicting an example of a computer system.

FIG. 7 is a block diagram depicting an example of a computer or printer system ("computer system") 700 upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an SATA bus or other bus. Moreover, one or more SSDs may be used, such as for RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 or may be a separate chip or chipset on a same motherboard or of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide program product 720. Program product 720 may be for implementing portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or other Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for printing to a medium with a printer, comprising:
    receiving a plurality of objects for a tile;
    counting an object count for each object type of the plurality of objects of the tile;
    initializing a tile-reuse count;
    generating a tile object associated with the plurality of objects;
    receiving tile area data for the tile, tiling area data for a tiling area, and bounding region data for a bounding region;
    checking for the tile area data having at least one dimension exceeding a corresponding bounding region dimension of the bounding region data;
    determining the tiling area data does not have at least one dimension exceeding the bounding region dimension;
    responsive to the determining the tiling area data does not have at least one dimension exceeding the bounding region dimension, checking for a total number of the plurality of objects exceeding an objects threshold; and
    responsive to the determining to the total number of the plurality of objects exceeds the plurality of objects threshold, generating a template for the tile.

2. The method according to claim 1, further comprising linking the template with the plurality of objects for tiling the tiling area by the printing with repeated use of the template by the printer.

3. The method according to claim 2, further comprising:
    checking for the plurality of objects being stored in memory;
    determining the plurality of objects are not stored in the memory; and
    responsive to the determining the plurality of objects are not stored in the memory, storing the plurality of objects in the memory.

4. The method according to claim 3, wherein the memory is cache of the printer.

5. A method for printing to a medium with a printer, comprising:
- receiving a plurality of objects for a tile;
- counting an object count for each object type of the plurality of objects of the tile;
- initializing a tile-reuse count;
- generating a tile object associated with the plurality of objects;
- receiving tile area data for the tile, tiling area data for a tiling area, and bounding region data for a bounding region;
- checking for the tile area data having at least one dimension exceeding a corresponding bounding region dimension of the bounding region data;
- determining the tiling area data does have at least one dimension exceeding the bounding region dimension; and
- responsive to the determining the tiling area data does have at least one dimension exceeding the bounding region dimension, generating a template for the tile for non-overlapping tiling.

6. The method according to claim 5, wherein the checking for the tile area data having the at least one dimension exceeding the bounding region dimension of the bounding region data comprises:
- checking for a bounding region width in the bounding region data less than a tile width in the tile area data; and
- checking for a bounding region height in the bounding region data less than a tile height in the tile area data.

7. The method according to claim 6, wherein the generating of the template comprises at least one of:
- responsive to the bounding region width being less than the tile width, adjusting the tile width to be equal to the bounding region width; or
- responsive to the bounding region height being less than the tile height, adjusting the tile height to be equal to the bounding region height.

8. The method according to claim 7, further comprising linking the template with the plurality of objects.

9. The method according to claim 8, further comprising performing the non-overlapping tiling in the tiling area defined by the tiling area data by the printing with repeated use of the template by the printer.

10. The method according to claim 8, further comprising:
- checking for the plurality of objects being stored in memory;
- determining the plurality of objects are not stored in the memory; and
- responsive to the determining the plurality of objects are not stored in the memory, storing the plurality of objects in the memory.

11. The method according to claim 10, wherein the memory is cache of the printer.

* * * * *